United States Patent [19]
Yamamoto et al.

[11] 3,908,489
[45] Sept. 30, 1975

[54] FASTENER DRIVER

[75] Inventors: Keiichi Yamamoto; Kozo Yamamoto, both of Tokyo, Japan

[73] Assignee: Yamamoto Byora Co., Ltd., Arakawa, Japan

[22] Filed: July 17, 1974

[21] Appl. No.: 489,366

[30] Foreign Application Priority Data
Nov. 30, 1973 Japan............................. 48-138208

[52] U.S. Cl. .............................. 81/121 B; 81/186
[51] Int. Cl.² ......................................... B25B 13/06
[58] Field of Search ....... 81/121 R, 121 B, 119, 186

[56] References Cited
UNITED STATES PATENTS
3,482,481 12/1969 Newell et al..................... 81/119 X
3,763,725 10/1973 Reiland............................ 81/121 R Primary Examiner—Al Lawrence Smith
Assistant Examiner—James G. Smith

[57] ABSTRACT

A fastener driver has the inner periphery of its cylindrical fitting recess provided with a plurality of semi-cylindrical ribs. The center of the cross sectional semicircle of the rib is situated on a radial line passing the center of the cross sectional circle of the fitting recess and within a range of said radial line defined between the latter center and a first intersection of two tangential lines, said tangential lines being tangent to said circle at second intersections where it intersects the semicircle.

14 Claims, 9 Drawing Figures

FIG. 5
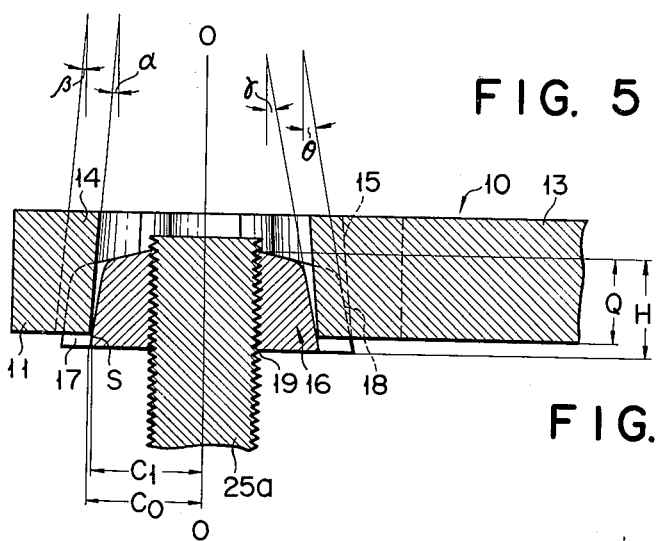
FIG. 6A
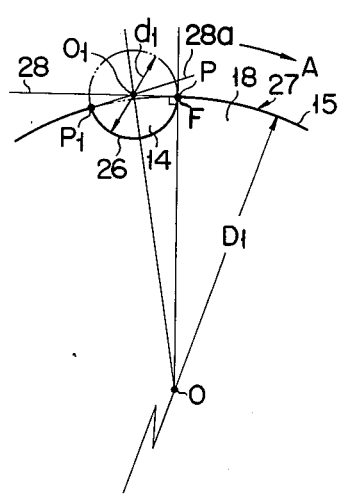
FIG. 6B
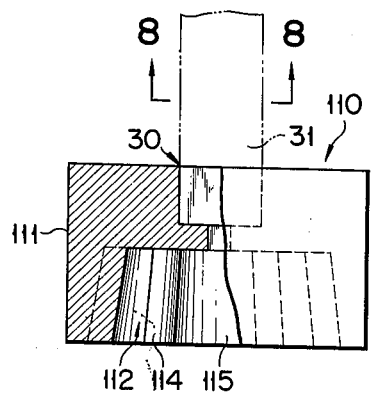
FIG. 7
FIG. 8
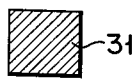

FASTENER DRIVER

This invention relates to a fastener driver for fastening fastener elements such as bolts, screws or nuts.

Conventionally, there is known a bolt or nut having its head or body presenting a hexagonal cross section. In this type of bolt or nut, however, a "driving angle," which is defined by a radial line passing a force-applied point with a tangential line to the driver contour at the forceapplied point, is large, i.e., denotes 60°. Therefore, the driver is apt to slip on the wall of the bolt or nut, so that torque loss is increased and the angular portions are likely to be worn unpreferably to assume a circular shape.

A novel fastener element which is designed to eliminate the above-mentioned drawbacks is proposed in our copending patent application Ser. No. 489,419, filed July 17, 1974. This fastener element has the periphery of its cylindrical male portion provided with a plurality of grooves presenting a partially circular cross section, the center of said groove partial circle being so positioned as to cause said "driving angle" to be set at 0°.

The object of the present invention is to provide a fastener driver suitable for fastening a fastener element according to the above-mentioned copending application.

The fastener driver according to the present invention includes a body provided with a cylindrical fitting recess and a plurality of engagement ribs formed on the peripheral wall of the recess, wherein each of said ribs forms in its cross section a partial circle projecting inward of the cross sectional circle of the fitting recess, and the center of said partial circle is so designed as to cause the "driving angle" to be set to 0°. For achieving this, the center of the partial circle is situated on a radial line extending from the center of the cross sectional circle of the fitting recess and within a range of said radial line defined between the latter center and a first intersection where two tangential lines intersect, said tangential lines being tangent to the cross sectional circle of the fitting recess at second intersections where the partial circle of the rib intersects the cross sectional circle of the recess.

When this fastener driver is used to transmit torque to the male portion (for example, bolt head) of a fastener element presenting the corresponding cross section to the driver recess, such a component of force as causes the driver to slip is not produced, and a reaction force applied from the bolt head to the driver so acts as to more tightly engage the driver with the head. For this reason, torque is almost totally transmitted from the driver to the bolt head, and in addition the fastener element or driver is not worn or damaged.

Where the center of the partial circle is positioned radially outside of the first intersection as in the case of the prior art, the driving angle indicates larger value than 0° with respect to the driving direction of the fastener driver, resulting in the drawbacks as described above.

The center of the partial circle of the rib is preferably situated between the first intersection and a chord connecting the second intersections. Where the center of the partial circle is positioned inside of the chord with respect to the center of the cross sectional circle of the fitting recess, the base of the rib becomes narrower to be fragile and further to render troublesome the positioning of the fastener driver relative to the fastener element.

The number of said ribs preferably ranges from four to eight, or is six in particular. Where the ribs are reduced in number to below four, it is troublesome to position the driver relative to the bolt head. Where the ribs are increased in number to above eight, the rib will be small to render the fastener driver easily wearable and in addition to permit errors to be produced in the measurement and positions of the ribs during manufacture.

Preferably, said ribs are disposed equidistantly from each other along said inner peripheral wall of the fitting recess, and the diameter of the partial circle of the rib cross section is defined by the equation:

$$\frac{1}{5} \cdot \frac{\pi}{n} \cdot D_1 \leq d_1 \leq \frac{1}{2} \cdot \frac{\pi}{n} \cdot D_1 \qquad (1)$$

where $n$ represents the number of ribs; $d_1$ the diameter of the partial circle of the rib cross section; and $D_1$ the diameter of the larger circle of the recess cross section. When the diameter of the partial circle is determined as above, any damage occurs neither in the driver nor in the bolt head. The reasons are as follows.

Usually, material constituting a bolt, screw or nut is standardized in tensile strength $\sigma_B$ within the range of 45 – 180 kg/mm², and material constituting the fastener driver is standardized in tensile strength $\sigma_B$ within the range of 120 – 180 kg/mm². Since the shearing strength of this type of material, particularly steel, can be regarded as proportional to the tensile strength thereof, the ratio of the shearing strength of a fastener element to that of a fastener driver ranges from 1.5:1 to 1:4. Further, the shearing strength of a fastener element is not usually higher than that of a fastener driver, so that said ratio comes to range from 1:1 to 1:4. It is understood from the above that if the width ratio of the force-applying portion (i.e., said rib of the fastener driver concave section) to the force-transmitted portion (i.e., the bolt head lobe engageable with the engagement groove between two adjacent ribs) ranges from 1:1 to 1:4, both said rib and said lobe will become equal in shearing resistance. The rib width approximates to the diameter $d_1$ of the semicircular cross section, and the width of said engagement groove formed between two adjacent ribs is substantially equal to the width of the bolt head lobe. Therefore, $$\frac{1}{4} \cdot l_1 \leq d_1 \leq l_1 \qquad (2)$$

where $l_1$ represents the width of the engagement groove of the driver recess.

On the other hand, the driver groove width $l_1$ is substantially equal to the length of that arc portion of said larger inner peripheral wall section circle which constitutes the inner periphery of said groove, and can be expressed as follows.

$$l_1 \doteq \frac{\pi}{n} \cdot D_1 - d_1 \qquad (3)$$

Accordingly, the equation (1) is derived from the equations (2) and (3). Where the number of ribs is set at, for example, six, the relation between the diameter of the rib semicircle and that of the larger inner peripheral section circle is expressed by the equation:

$0.1 D_1 \leqq d_1 \leqq 0.25 D_1$

Actually, a fastener element and fastener driver are most widely used which have tensile strengths bearing the ratio of 1:2 to 1:3. Accordingly, in view of the general practicability and economy, the diameter of the semicircular cross section preferably is defined by the equation:

$$\frac{1}{4} \cdot \frac{\pi}{n} \cdot D_1 \leqq d_1 \leqq \frac{1}{3} \cdot \frac{\pi}{n} \cdot D_1$$

Said fitting recess is preferably tapered at an angle of 1° to 10° with respect to the central axis of the fastener driver and is less tapered with respect thereto than the corresponding fastener element. The lower end cross section of the driver recess is formed in corresponding relationship to a cross section slightly above the lower end of the fastener element. This shape of fastener driver permits an easy disengagement of the fastener driver from the mold at the manufacturing time and a ready engagement of the fastener driver with a fastener element. Further, when engaged with the fastener element, the fastener driver is always tightly fitted to the fastener element at a point slightly above the lower end of the element. For this reason, the fastener element is prevented from falling off the fastener driver by its weight. This offers a convenience, particularly where such element is forced to be brought to a hand-unreachable narrow fastening place.

This invention will now be described more in detail by reference to the accompanying drawings.

FIG. 1 is a perspective view of a fastener driver according to an embodiment of the invention;

FIGS. 2 and 3 respectively are perspective views of a nut and bolt to be fastened by the fastener driver of FIG. 1;

FIG. 5 is a longitudinal sectional view taken on line 5—5 of FIG. 4;

FIGS. 6A and 6B are respectively illustrations showing the relationship of a driving angle with the center-position of the semicircle of the fastener driver rib;

FIG. 7 is a longitudinal sectional view, partly in section, of a fastener driver according to another embodiment of the invention; and FIG. 8 is a sectional view taken on line 8—8 of FIG. 7.

Figure 1:
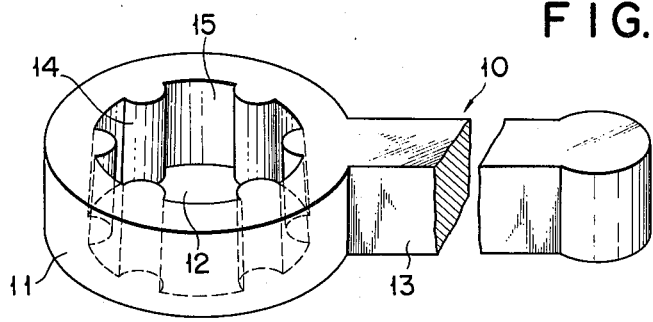

Referring to FIG. 1, a fastener driver 10 according to the invention comprises a body 11 having a fitting hole 12 formed therein and a handle grip 13 radially extending from the body in a manner integral therewith. The fitting hole 12 has a cross section of a larger circle 27 (FIG. 4), and the inner peripheral wall of said hole is formed with six ribs 14 disposed equidistantly from each other and along said wall. Between the respective adjacent ribs are formed engagement grooves 15 presenting an arcuate cross section. The rib 14 has a constant width all over its length and extends from the upper surface of the body to the lower surface thereof along the center axis of the body. The cross section of the rib assumes a substantially semicircular shape 26 projecting radially inward of the hole 12. In this embodiment, the handle grip 13 is formed integrally with the body 11, but may be formed detachably from the body. Further, where a nut or bolt to be fastened is relatively small, the grip may be allowed to project in the axial direction of the body. Also in this case, the grip may be integral with or detachable from the body.

Figure 2:
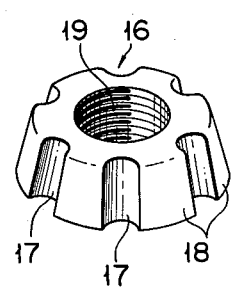
Figure 3:
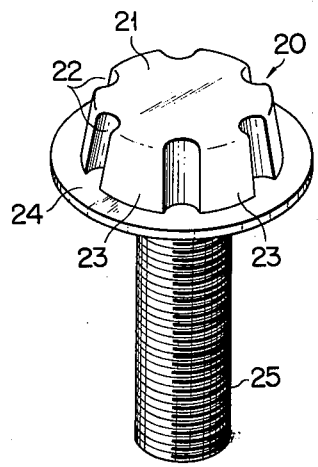

A nut and a bolt shown in FIGS. 2 and 3 is suitable to be fastened by the driver 10, the detail concerned therewith being described in the specification of the present inventors' copending application. The nut 16 indicates a circular cross section, and the output peripheral wall thereof is formed with grooves 17 assuming a semicircular shape in cross section. The groove 17 is so formed as to conform with the rib 14 of the driver while the lobe 18 formed between two adjacent grooves 17 is so shaped as to conform with the engagement groove 15 of the driver. In the central part of the nut is threaded a screw hole 19 coaxial with the central axis thereof. The head 21 of the bolt 20 is also formed with the same groove 22 and lobe 23 as in the case of the nut 16. Said head is formed on its lower surface with a flange-shaped washer 24 having a larger diameter than the head. From this washer is extended coaxially a threaded shank 25.

Figure 4:
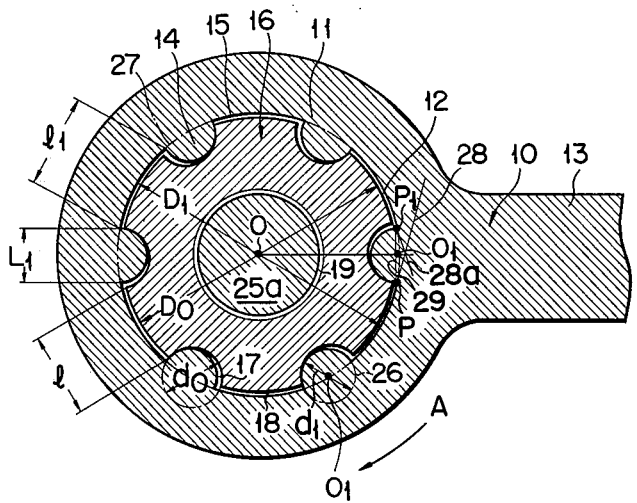
FIG. 4 is a cross sectional view illustrating the condition in which the fastener driver is fitted to a nut.

Referring to FIGS. 4 and 5, the respective ribs 14 of the driver are in a state engaged with the respective grooves 17 of the nut 16 while the respective engagement grooves 15 of the driver are in a state engaged with the respective lobes 18 of the nut. The threaded shank 25a is in a state screwed into the nut hole 19. Where the driver is rotated in a direction indicated by an arrow A, the effective transmission of drive torque from the driver rib 14 to the nut lobe 18 requires for "driving angle" to be taken into consideration. This "driving angle" is the one defined by a radial line passing a point (force-applied point at which, when fastened or released, the nut is pressed by the driver) with a tangential line to the driver contour at said force-applied point. Where the "driving angle" is positive with respect to the driver-driven direction, a component of force is produced which causes the driver to be slipped (relative to the nut) to interrupt torque from being sufficiently transmitted to the nut. Due to this slippage, the nut lobe becomes more likely to be worn or damaged. On the other hand, where the "driving angle" is 0° with respect to the driver-driven direction, the aforesaid driver slippage does not occur, so that torque transmission is effected very efficiently and a good engagement of the driver with the nut is also attained. In view of this respect, the present invention is designed to shape the driver rib 14 so that the "driving angle" becomes 0° with respect to the driver-driven direction.

FIGS. 6A and 6B respectively illustrate the relationship of a "driving angle" with various center-positions of the semicircles in rib cross sections. The cross sectional configuration of the fitting hole 12 can be regarded as substantially same as that of the nut 16. Therefore, in FIGS. 6A and 6B, the hole contour and the nut contour are respectively drawn by the identical curved line.

Referring to FIG. 6A, the central point $O_1$ of the cross sectional semicircle 26 of the nut groove 17, accordingly of the driver rib 14, is situated on the intersection of the tangential lines 28 and 28a which are tangent to the larger circle 27 (the center is indicated by O) of the fitting hole cross section at the intersections P and $P_1$ where the semicircle 26 intersects said larger circle 27. In this case, the intersection P is regarded as the force applied point F when the nut is driven in the direction indicated by arrow A and the tangential line to the rib 14 at the point P coincides with a radial line $\overline{OF}$. Therefore, the "driving angle" denotes 0° resultantly to cause torque to be totally transmitted from the rib 14 to the lobe 16.

In FIG. 6B, the central point $O_1$ of the semicircle 26 is situated on the chord 29 connecting together the intersections P and $P_1$ of the semicircle 26 and the larger circle 27. In this case, the force-applied point F is situated slightly inside of the circle 27 and tangential line to the semicircle 26 at the point F coincides with the radial line $\overline{OF}$. Therefore, the "driving angle" denotes 0° as in the case of the above example.

When the central point $O_1$ of the semicircle 26 is situated as described above, the "driving angle" denotes 0° with respect to the driver-driven direction. For this reason, the torque transmission efficiency is extremely increased and the driver slippage is also prevented.

Where the central point $O_1$ of the semicircle 26 is situated inside of the chord 29 with respect to the central point O of the larger circle 27, the driving angle denotes 0° with respect to the driver-driven direction. However, the corners defined between the semicircle 26 and the larger circle 27 are rendered acute, so that the driver damage becomes liable to occur.

This invention gives consideration to the material quality of the driver and fastener elements in addition to properly situate the central position of the cross sectional semicircle of said rib, and is so standardized as to prevent the occurrence of damages of the driver or fastener elements.

Usually, where, as before mentioned, consideration is given to the shearing strength of materials used to make the driver and a fastener element (for example, a nut), it is understood that, in order to equalize the shearing resistances of the driver and nut in the vicinity of the force-applied point thereof, the ratio of the width of the driver rib 14 to that of the nut lobe 18 has to range from 1:1 to 1:4, or preferably 1:2 to 1:3. Again in FIG. 4, since the rib width $L_1$ approximates to the diameter $d_1$ of the semicircle 26, the relationship between the width $l$ of the nut lobe 18 and the diameter $d_1$ of the semicircle is expressed as follows:

$$\frac{1}{4} l \leq d_1 \leq l \text{ or preferably } \frac{1}{3} l \leq d_1 \leq \frac{1}{2} l$$

On the other hand, the lobe width $l$ is substantially equal to the width $l_1$ of the engagement groove 15 of the driver and said width $l_1$ is substantially equal to the arc length of the inner periphery of the groove 15. Therefore, $$l \doteq l_1 \doteq \frac{1}{n} \pi D_1 - d_1$$

When the latter equation is substituted in the former equation, the following equation is obtained.

$$\frac{1}{5} \cdot \frac{\pi}{n} \cdot D_1 \leq d_1 \leq \frac{1}{2} \cdot \frac{\pi}{n} \cdot D_1$$

or preferably $$\frac{1}{4} \cdot \frac{\pi}{n} \cdot D_1 \leq d_1 \leq \frac{1}{3} \cdot \frac{\pi}{n} \cdot D_1$$

Accordingly, since, in this embodiment, the number $n$ of the rib 14 is six, the diameter $d_1$ of the semicircle 26 has to be defined as follows with respect to the diameter $D_1$ of the larger circle 27.

$$0.1 D_1 \leq d_1 \leq 0.25 D_1 \text{ or preferably}$$

$$0.12 D_1 \leq d_1 \leq 0.17 D_1$$

When the respective diameters of the semicircle and the larger circle are set as above, the respective shearing resistances of the driver rib 14 and nut lobe 18 are substantially equalized. Even if, therefore, torque transmission is totally effected from the driver to the nut, neither will be damaged.

However, where $$d_1 < \frac{1}{5} \cdot \frac{\pi}{n} \cdot D_1,$$

the driver becomes apt to be damaged. Conversely, where $$d_1 > \frac{1}{2} \cdot \frac{\pi}{n} \cdot D_1,$$

the nut becomes likely to be damaged.

In FIG. 5, the driver rib 14 and the engagement groove 15 are respectively inclined at an angle of $\alpha$ and $\beta$ with respect to the central axis O—O of the driver body 11. The angles $\alpha$ and $\beta$ are equal to each other and limited to the range of $1° \leq \alpha = \beta < 10°$.

On the other hand, the nut groove 17 and the lobe 18 are respectively inclined at angles of $\gamma$ and $\theta$ with respect to the central axis O—O, and bears the following relationship with the angles $\alpha$ and $\beta$.

$$\alpha = \beta < \gamma = \theta$$

Further, the maximum distance $C_1$ between the apex of the driver rib 14 and the central axis O—O is set as follows with respect to the maximum distance $C_0$ between the bottom of the nut groove 17 and the central axis O—O.

$$C_1 \leq C_0$$

The maximum inner diameter $D_1$ of the driver hole 12 bears the following relationship with the maximum outer diameter $D_0$ of the nut.

$$D_1 \leq D_0$$

When, in case the driver is engaged with the nut in such a manner as shown in FIG. 5, the nut height is designated by H and the distance between the upper end of the nut and the engagement point of the driver with the nut by Q, the following relationship is always established.

$$Q \leq H$$

For this reason, when the driver has been securely engaged with or fitted to the nut, such engagement is effected slightly above the lower end of the nut to prevent the driver from being readily detached from the nut and further to enable a relatively smooth engagement of the driver with the nut.

A fastener driver 110 shown in FIG. 7 has at the central part of its top portion a depression 30 presenting a rectangular cross section. Into said depression is detachably fitted, for example, a shank 31 presenting the same cross section (FIG. 8). Said shank is manually or power-rotated. In the bottom portion of the driver body 111 is formed a fitting or engagement recess 112 whose inner wall is formed with a rib 114 and an engagement groove 115. These constituent elements are constructed in the same manner as in the preceding first embodiment.

This invention can be practised in various modifications without departing from the scope or object of the invention.

What we claim is:

1. A fastener driver comprising a body having a fitting recess, said fitting recess having its inner periphery provided with a plurality of ribs and a plurality of engagement grooves defined between the respective adjacent ribs, said fitting recess forming a first circle at its cross section; each of said ribs forming at its cross section a partial circle bowed inside of the first circle; the center of the partial circle being situated on a corresponding radial line extending from the center of the first circle and within a range of said radial line defined between said latter center and a first intersection where two tangential lines intersect, said tangential lines being tangent to the first circle at second intersections respectively where the first circle intersects the partial circle, said partial circle of each said rib having a constant radius over the length of each said rib, and each rib extending in alignment with the generatrix of said inner periphery of said fitting recess.

2. A fastener driver according to claim 1 wherein said center of the partial circle is situated between the first intersection and a chord connecting the second intersections.

3. A fastener driver according to claim 2 wherein the ribs of the fitting recess are equidistantly spaced circumferentially of the fitting recess, and the diameter of the rib partial circle is defined by the equation:

$$\frac{1}{5} \cdot \frac{\pi}{n} \cdot D_1 \leq d_1 \leq \frac{1}{2} \cdot \frac{\pi}{n} \cdot D_1$$

where $D_1$ represents the diameter of the first circle, $d_1$ the diameter of the partial circle, and n the number of the ribs.

4. A fastener driver according to claim 3 wherein the number of said ribs is four to eight.

5. A fastener driver according to claim 1 wherein said body is provided with a handle grip for rotating the body about the central axis of the fitting recess.

6. A fastener driver according to claim 5 wherein said handle grip radially extends from the body in a manner integral therewith.

7. A fastener driver according to claim 5 wherein said body is formed with a handle engaging hole; and said handle grip is detachably engageable with said engaging hole.

8. A fastener driver comprising a body having a fitting recess, said fitting recess having its inner periphery provided with a plurality of ribs and a plurality of engagement grooves defined between the respective adjacent ribs, wherein, when said driver is fitted to a fastener element having a similar cross section to that of the fitting recess, said ribs and engagement grooves of the fitting recess are engaged with corresponding grooves and lobes of the fastener element respectively, said fitting recess forming a first circle at its cross section; each of said ribs forming at its cross section a partial circle bowed inside of the first circle; the center of the partial circle being situated on a corresponding radial line extending from the center of the first circle and within a range of said radial line defined between said latter center and a first intersection where two tangential lines intersect, said tangential lines being tangent to the first circle at second intersections where the first circle intersects the partial circle, said partial circle of each said rib having a constant radius over the length of each said rib, and each rib extending in alignment with the generatrix of said inner periphery of said fitting recess; and the ribs and the engagement grooves of the fitting recess being respectively inclined to the central axis of the fitting recess at angles defined by the equations:

$$1° \leq \alpha = \beta < 10°$$
$$\alpha = \beta < \nu = \theta$$

where $\alpha$ represents the inclined angle of the rib of the fastener driver, $\beta$ the inclined angle of the engagement groove of the fastener driver, $\nu$ the inclined angle of said corresponding groove of the fastener element, and $\theta$ the inclined angle of the lobe of the fastener element.

9. A fastener driver according to claim 8 wherein said center of the partial circle is situated between the first intersection and a chord connecting the second intersections.

10. A fastener element according to claim 9 wherein the ribs of the fitting recess are equidistantly spaced circumferentially of the fitting recess, and the diameter of the rib partial circle is defined by the equation:

$$\frac{1}{5} \cdot \frac{\pi}{n} \cdot D_1 \leq d_1 \leq \frac{1}{2} \cdot \frac{\pi}{n} \cdot D_1$$

where $D_1$ represents the diameter of the first circle, $d_1$ the diameter of the partial circle, and n the number of the ribs.

11. A fastener element according to claim 10 wherein the number of said ribs is four to eight.

12. A fastener element according to claim 8 wherein said body is provided with a handle grip for rotating the body about the central axis of the fitting recess.

13. A fastener driver according to claim 12 wherein said handle grip radially extends from the body in a manner integral therewith.

14. A fastener driver according to claim 12 wherein said body is formed with a handle engaging hole; and said handle grip is detachably engageable with said hole.

* * * * *